United States Patent [19]

Richards

[11] 4,168,736
[45] Sep. 25, 1979

[54] METHOD OF REPAIRING FERROUS METAL BODIES

[75] Inventor: Glanville J. Richards, Llanelli, England

[73] Assignee: Goricon Metallurgical Services Limited, Bridgend, England

[21] Appl. No.: 637,572

[22] Filed: Dec. 4, 1975

[51] Int. Cl.² .................. B22D 19/10; B23K 23/00
[52] U.S. Cl. .................................. 164/54; 164/55; 164/92; 228/198; 29/401 A; 29/401 E
[58] Field of Search ............... 164/54, 53, 58, 92, 164/9, 55; 228/198, 241, 252; 29/401 A, 401 E

[56] References Cited

U.S. PATENT DOCUMENTS

| 3,421,570 | 1/1969 | Guntermann | 164/53 |
| 4,005,742 | 2/1977 | Kachik et al. | 164/92 X |

FOREIGN PATENT DOCUMENTS

| 27748 | 12/1964 | Japan | 164/92 |
| 919815 | 2/1963 | United Kingdom | 228/241 |

Primary Examiner—Othell M. Simpson
Assistant Examiner—Gus T. Hampilos
Attorney, Agent, or Firm—A. W. Breiner

[57] ABSTRACT

It is known to fill errosion holes in ingot mould bottoms, and other holes in ferrous metal bodies, with metal produced in situ by exothermic reaction. By the present invention, the exothermic composition is used in conjunction with a particulate refractory material. The refractory is bound by a matrix of solidified slag, produced by the reaction, to form a non-metallic filling having a working surface providing a high resistance to thermal shock. A metal phase is produced by the reaction but is merely incidental.

10 Claims, 2 Drawing Figures

METHOD OF REPAIRING FERROUS METAL BODIES

The present invention relates to metallurgical compositions and has as an object the provision of compositions for repairing mould components.

An ingot mould usually consists of an open ended cast iron body, e.g. of rectangular cross section, slightly tapered internally to facilitate removal of the solidified ingot. The mould is set on a cast iron base which forms the bottom of the moulding cavity. This same base is used with moulds of different sizes which are arranged centrally located on the base. The molten metal poured in from the top of the mould in casting the ingots thus tends to impinge upon the same region of the base. The resulting progressive erosion eventually produces a hole of unacceptable depth.

The present invention is based upon the discovery that an acceptable repair may be achieved by filling the hole to produce a working surface of a wear-resisting non-metallic inorganic material formed in situ.

In accordance with one aspect of the present invention there is provided a composition for use in the filling of such a hole which comprises a heat generating composition formed of solid components which react together exothermically to form a molten slag and, in admixture therewith, a particulate refractory material in an amount such as to be bound together by a matrix of the slag on cooling after the exothermic reaction. There is further provided an ingot mould base or other body of ferrous metal having a hole which is filled through at least a part of its depth by a particulate refractory material bound by a matrix of slag produced from a composition as aforesaid. Still further there is provided a method of filling a hole in an ingot mould base or other body of ferrous metal which comprises introducing a composition as aforesaid into the hole and reacting it in situ.

Suitably the heat generating composition is a particulate metal which is oxidised in the reaction to form the slag. A preferred heat generating composition of this type is a mixture of aluminium powder and ferric or other iron oxide which reacts exothermically to produce aluminium oxide as a slag, and metallic iron. Such a mixture, known as thermite, is commercially available and is used in certain welding operations.

Thermite has been used previously for the present purpose, but in such a manner as to fill the hole with a weld button of metallic iron. The slag produced by the exothermic reaction is an unwanted product which is discarded. Because of its physical properties, e.g. its brittleness, it could not be used to provide a useful working surface. The result is imperfect in that the molten metal can fuse with the metal of the button so that the button is pulled out of the hole when the ingot is stripped from the base. In contrast the present composition is used in such a manner that the hole is finished with the refractory material bound by the slag to form a brick-like material. Underlying the brick-like material is a weld-button produced as a by-product of the reaction. Its presence is incidental and the working surface is provided by the brick-like material which provides the working surface and has a high resistance to thermal shock. As the brick-like material is worn away with continued use, it may be repaired using appropriate amounts of the composition before the weld button is exposed.

The refractory material of the composition may be of the fired-clay or other ceramic type. Conveniently, there may be used firebrick (e.g. recovered from steelworks) which has been reduced to particulate form, e.g. by crushing. Alternative refractory materials are silicon carbide, and magnesite, alumino silicates, burned dolomite, alumina and mixtures of these materials. Magnesite is attractive because of its favourable co-efficient of expansion. The particle size is not critical, and for most purposes a suitable finish is obtained using particulate firebrick or other refractory material of coarse grade. Good results have been obtained with firebrick sieved to less than one-eighth inch. Improved results have been obtained with firebrick granules which pass a half inch sieve but are retained on an eighth inch sieve, probably because of the avoidance of fine particles having a relatively high solubility in the slag.

A suitable proportion of the refractory material may be ascertained by simple experiment. Using crushed firebrick in an amount of from 15 to 30%, preferably about 20% based on the weight of the composition gives satisfactory results with thermite containing from 60 to 70% by weight of aluminium calculated at $Al_2O_3$.

According to a modification of the method as hereinbefore described, the particulate refractory material or a part thereof is introduced into the slag formed in the hole whilst it is still in the molten state. Typically the refractory material is mixed with the slag by stirring. It is not necessary that the mixture produced should be homogeneous throughout the depth of the hole when the requirement is to provide a filling giving a working surface of satisfactory properties.

The accompanying drawing is given in order to illustrate the invention. In the drawing.

Figure 1:
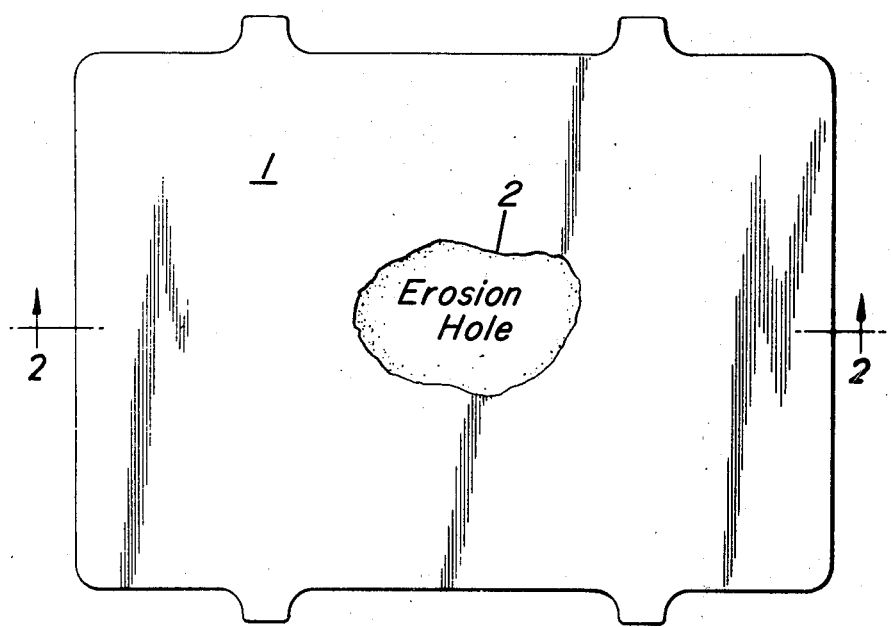
FIG. 1 is a plan showing an ingot mould base with an erosion hole therein.

The ingot mould base 1 of FIG. 1, formed of cast iron has a deep irregular erosion hole 2 formed by impingement of molten steel in the casting of ingots over a period of use of the base.

Figure 2:
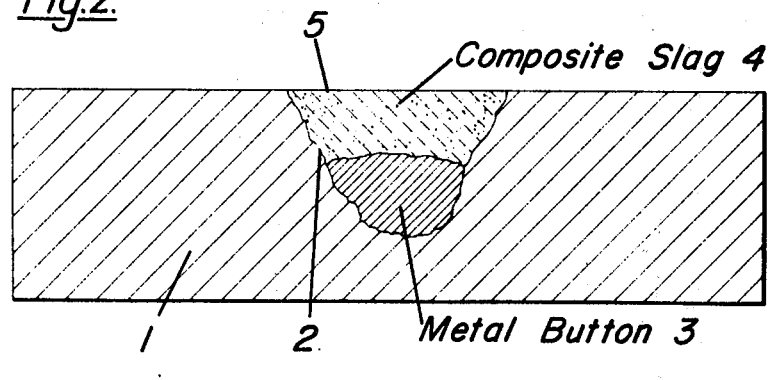
FIG. 2 is a cross section taken along 2—2 of FIG. 1 after repair by the method of the invention.

FIG. 2 shows the base after repair. The bottom of hole 2 is occupied by a solidified iron button 3 produced by exothermic reaction in situ of a composition of the kind hereinbefore described formed from metallic aluminium powder, iron oxide and a particulate refractory material, said exothermic reaction being followed by gravitational separation of the iron. Above the button 3, and adhering to the wall of the hole 2 is a gravitationally separated and solidified layer of composite slag 4, formed of a matrix of solidified aluminous material, derived from the aluminium, which binds together the crushed firebrick or other particulate refractory, and provides an upper working surface having a high resistance to thermal shock when the base is again put into use for further ingot casting operations.

I claim:

1. A method of repairing a body of ferrous metal by filling the surface forming a cavity in said body, said method comprising the steps of introducing into the cavity a heat generating composition in the form of a first metal in particulate metallic form and a second metal in the form of a compound reactable exothermically with the first metal to yield the second metal in the fused metallic state and a molten slag containing the first metal in an oxidized state, exothermically reacting the composition in the cavity to form the molten slag and fused second metal therein, also introducing into the cavity a non-metallic refractory material in the form of particles, and allowing the second metal and the slag to set to the solid state so that the cavity is filled at least partially by solidified material having an upper zone of solid slag and refractory material and a lower zone of solidified second metal.

2. A method of repairing a body of ferrous metal by filling the surface forming a cavity in said body which method comprises introducing into the cavity a heat generating composition in the form of a first metal in particulate metallic form and a second metal in the form of a compound reactable exothermically with the first metal to yield the second metal in the fused metallic state and a molten slag containing the first metal in an oxidised state, exothermically reacting the composition in the cavity to form the molten slag and fused second metal therein, also introducing into the cavity a non-metallic refractory material in the form of particles, and allowing the second metal and the slag to set to the solid state with the slag binding the particles of refractory material together, so that the cavity is filled at least partially by solidified material having an upper zone of solid slag and bound refractory material and a lower zone of solidified second metal.

3. A method according to claim 1 in which the particulate refractory material is introduced into the hole in admixture with the heat generating composition.

4. A method according to claim 1 in which the particulate refractory material is added to the slag whilst the slag is in the molten state in the hole.

5. A method according to claim 1 in which the heat generating composition is a mixture of aluminium powder and ferric oxide.

6. A method according to claim 1 in which the refractory material is of the fired clay type.

7. A method according to claim 6 in which the refractory material is firebrick material which has been reduced to particulate form.

8. A method according to claim 1 in which the refractory material is present in an amount of from 15 to 30% based on the total weight of the composition.

9. A method according to claim 8 in which the body of ferrous metal is an ingot mould base.

10. A method according to claim 1 in which the body of ferrous metal is formed of cast iron.

* * * * *

UNITED STATES PATENT AND TRADEMARK OFFICE
CERTIFICATE OF CORRECTION

PATENT NO. : 4,168,736
DATED : September 25, 1979
INVENTOR(S) : Glanville J. Richards It is certified that error appears in the above-identified patent and that said Letters Patent are hereby corrected as shown below:

Column 2, "Patent Claim 1" should read -- Patent Claim 2 --; and

Column 3, "Patent Claim 2" should read -- Patent Claim 1 --.

Signed and Sealed this

Twelfth Day of August 1980

[SEAL]

Attest:

SIDNEY A. DIAMOND

Attesting Officer

Commissioner of Patents and Trademarks